United States Patent
Park et al.

(10) Patent No.: US 10,445,050 B2
(45) Date of Patent: Oct. 15, 2019

(54) IMAGE DISPLAY APPARATUS AND OPERATING METHOD OF THE SAME

(71) Applicant: SAMSUNG ELECTRONICS CO., LTD., Suwon-si, Gyeonggi-do (KR)

(72) Inventors: Ji-yong Park, Suwon-si (KR); Sang-kyun Im, Seoul (KR); Young-hoon Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 15/689,702

(22) Filed: Aug. 29, 2017

(65) Prior Publication Data

US 2018/0060015 A1 Mar. 1, 2018

(30) Foreign Application Priority Data

Aug. 30, 2016 (KR) .................. 10-2016-0110835

(51) Int. Cl.
| | |
|---|---|
| G06F 3/14 | (2006.01) |
| G09G 5/14 | (2006.01) |
| G09G 5/00 | (2006.01) |
| G09G 5/02 | (2006.01) |
| G09G 3/20 | (2006.01) |

(52) U.S. Cl.
CPC ............ *G06F 3/1446* (2013.01); *G09G 5/00* (2013.01); *G09G 5/003* (2013.01); *G09G 5/02* (2013.01); *G09G 5/14* (2013.01); *G09G 3/2003* (2013.01); *G09G 2300/026* (2013.01); *G09G 2300/0452* (2013.01); *G09G 2320/068* (2013.01); *G09G 2320/0613* (2013.01); *G09G 2320/0666* (2013.01); *G09G 2340/0442* (2013.01); *G09G 2340/0492* (2013.01)

(58) Field of Classification Search
None
See application file for complete search history.

(56) References Cited

U.S. PATENT DOCUMENTS

| | | | | |
|---|---|---|---|---|
| 2009/0021476 A1* | 1/2009 | Steinle | ................ | G16H 40/63 345/156 |
| 2012/0075166 A1* | 3/2012 | Marti | ................ | G06F 3/011 345/1.1 |
| 2013/0181884 A1* | 7/2013 | Perkins | ................ | H04N 9/3147 345/1.3 |

(Continued)

OTHER PUBLICATIONS

"The Modular TVs of the Future—Samsung Booth—CES 2016." [Online Youtube video]. Jan. 7, 2016 [retrieved on Aug. 14, 2017]. Retrieved from the Internet: <URL: https://www.youtube.com/watch?v=9LNnTiEgx5U>.

*Primary Examiner* — Aaron M Richer
(74) *Attorney, Agent, or Firm* — Staas & Halsey LLP

(57) ABSTRACT

An operating method of an image display apparatus includes detecting a screen aspect ratio of an input image; determining rotation control information regarding a tiled display of the image display apparatus, the tiled display including a plurality of individually rotatable display modules, according to the detected screen aspect ratio of the input image; rotating each of the plurality of display modules according to the determined rotation control information; and controlling the plurality of display modules to display the input image according to the determined rotation control information.

11 Claims, 8 Drawing Sheets

(56) References Cited

U.S. PATENT DOCUMENTS

| | | | |
|---|---|---|---|
| 2014/0049563 A1* | 2/2014 | Tobin | G06F 3/012 345/649 |
| 2015/0262331 A1* | 9/2015 | Bang | G06F 3/1431 345/1.3 |
| 2016/0132283 A1 | 5/2016 | Hall | |
| 2016/0196805 A1* | 7/2016 | Chen | G06T 3/40 345/667 |

* cited by examiner

IMAGE DISPLAY APPARATUS AND OPERATING METHOD OF THE SAME

CROSS-REFERENCE TO RELATED APPLICATION

This application claims the benefit of Korean Patent Application No. 10-2016-0110835, filed on Aug. 30, 2016, in the Korean Intellectual Property Office, the disclosure of which is incorporated herein in its entirety by reference.

BACKGROUND

1. Field

The present disclosure relates to an image display apparatus and an operating method of the same, and more particularly, to an image display apparatus capable of controlling a tiled display according to a screen aspect ratio of an input image and an operating method of the image display apparatus.

2. Description of the Related Art

An image display apparatus has a function for displaying an image viewable by a user. A user may watch a broadcast on the image display apparatus. The image display apparatus may display a user-selected broadcast on a display from among broadcast signals transmitted from a broadcast station and may also display signals input from various external sources on the display. Signals input to the image display apparatus may have various screen aspect ratios.

Furthermore, the image display apparatus may be implemented as a tiled display including a plurality of display modules.

SUMMARY

Provided are an image display apparatus capable of determining rotation control information regarding a tiled display according to a screen aspect ratio of an input image and controlling the tiled display to display the input image and an operating method of the image display apparatus.

Additional aspects will be set forth in part in the description which follows and, in part, will be apparent from the description, or may be learned by practice of the presented embodiments.

According to an aspect of an embodiment, an image display apparatus includes a tiled display including a plurality of display modules, wherein each of the display module is rotatable; and a controller configured to detect the screen aspect ratio of an input image, determine rotation control information regarding the tiled display according to the detected screen aspect ratio of the input image, rotate each of the plurality of display modules according to the determined rotation control information, and control the plurality of display modules to display the input image according to the determined rotation control information.

The rotation control information may include at least one of a rotating direction of the tiled display and a rotation angle of the tiled display.

The controller may be configured to control the white balances of the plurality of display module that displayed the input image.

The controller may be configured to determine the rotation angle to 90 degrees when the screen aspect ratio of the input image is detected as being equal to 21:9 (an anamorphic wide screen aspect ratio).

The controller may be configured to control to determine the rotation angle of the tiled display at a certain time interval using the determined rotation control information.

According to an aspect of another embodiment, a method of operating an image display apparatus, the method includes detecting the screen aspect ratio of an input image; determining rotation control information regarding a tiled display including a plurality of individually rotatable display modules according to the detected screen aspect ratio of the input image; rotating each of the plurality of display modules according to the determined rotation control information; and controlling the plurality of display modules to display the input image according to the determined rotation control information.

The rotation control information may include at least one of a rotating direction of the tiled display and a rotation angle of the tiled display.

The method may further include controlling the white balances of the plurality of display module that displayed the input image.

The determining of the rotation control information regarding the tiled display may include determining the rotation angle to 90 degrees when the screen aspect ratio of the input image is detected as being equal to 21:9 (an anamorphic wide screen aspect ratio).

The method may further include determining the rotation angle of the tiled display at a certain time interval using the determined rotation control information.

According to an aspect of another embodiment, there is provided a non-transitory computer readable recording medium having recorded thereon a computer program for implementing the above-stated method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
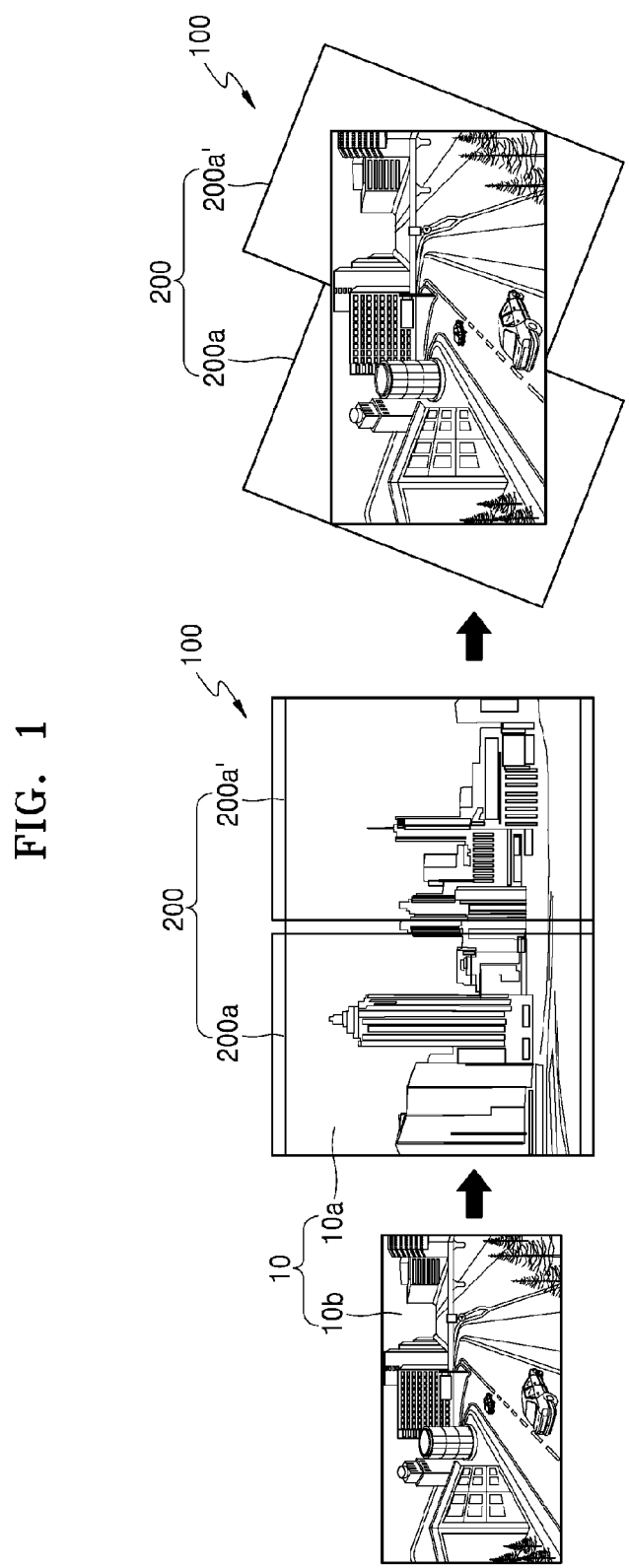
FIG. 1 is a diagram showing an image display apparatus for displaying an image using a tiled display according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Therefore, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

While such terms as "first," "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

In the present specification, and particularly in the claims, the term "above" and similar directives may encompass to both singular expression and plural expression. In addition, if there is no description explicitly specifying the order of the steps for describing the method according to the present disclosure, the described steps can be done in a proper order. The present disclosure is not limited by the order of descriptions of the steps.

Appearances of the phrases 'in some embodiments,' 'in certain embodiments,' 'in various embodiments,' and similar language throughout this specification may, but do not necessarily, all refer to the same embodiment, but mean 'one or more but not all embodiments' unless expressly specified otherwise.

Some of embodiments of the present disclosure may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the invention may be implemented with any programming or scripting language, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, the present disclosure will be described in detail with reference to the attached drawings.

FIG. 1 is a diagram showing an image display apparatus for displaying an image using a tiled display according to an example embodiment.

Referring to FIG. 1, an image display apparatus 100 according to an example embodiment may be a TV. However, this is merely an example, and the image display apparatus 100 may be implemented as an electronic device including a display. For example, the image display apparatus 100 may be implemented as any of various electronic devices, such as a mobile phone, a tablet PC, a digital camera, a camcorder, a laptop computer, a desktop computer, an e-book terminal, a digital broadcast terminal, a personal digital assistant (PDA), a portable multimedia player (PMP), a navigation device, an MP3 player, and a wearable device. In particular, example embodiments may be easily implemented in a display device having a large display, such as a TV, but the present disclosure is not limited thereto. Furthermore, the image display apparatus 100 may be of a stationary type or a mobile type and may be a digital broadcast receiver capable of receiving digital broadcast.

The image display apparatus 100 according to an example embodiment includes a tiled display including a plurality of display modules (e.g., a plurality of displays), wherein each of the display modules may be rotated. Furthermore, the image display apparatus 100 may control the plurality of display modules to detect a screen aspect ratio of an input image, determine rotation control information regarding the tiled display according to the detected screen aspect ratio of the input image, rotate each of the plurality of display modules according to the determined rotation control information, and display the input image according to the determined rotation control information.

The tiled display 205 includes the plurality of display modules, wherein each of which may be rotated. Although FIG. 1 shows the tiled display 205 including a first display module 200a and a second display module 200a' that are arranged side-by-side in a horizontal direction, the present disclosure is not limited thereto. In other words, the number and arrangement of display modules constituting the tiled display 205 may vary. For example, according to an embodiment, the tiled display 205 may include three or more display modules linearly arranged in a horizontal or vertical direction or in a matrix-like shape. Each of the plurality of display modules may be rotated by 360 degrees. Also, each of the plurality of display modules may not only be rotated but also be moved along various trajectories, such as a linear trajectory.

Referring to FIG. 1, a first display module 200a and a second display module 200a' constituting the tiled display 205 may be rotated according to rotation control information regarding the tiled display 205 determined based on a screen aspect ratio of an input image 10. The screen aspect ratio of an input image generally represents a ratio between a width and a height of an image input to the image display apparatus 100. The image display apparatus 100 may determine rotation control information regarding the tiled display 205, such that the screen aspect ratio of an input image may be maintained.

In other words, when the tiled display 205 of the image display apparatus 100 is not rotated, the tiled display 205 may display an image 10a corresponding to a first screen aspect ratio. When the image display apparatus 100 receives an image 10b corresponding to a second screen aspect ratio that is different from the first screen aspect ratio, the image display apparatus 100 may rotate-control each of the first display module 200a and the second display module 200a' of the tiled display 205, such that the tiled display 205 displays the image 10b corresponding to the second screen aspect ratio. For example, the first screen aspect ratio may be 16:9, whereas the second screen aspect ratio may be 21:9.

The rotation control information regarding the tiled display 205 according to an example embodiment may include at least one of a rotating direction of the tiled display 205, a rotation angle of the tiled display 205, and a unit rotation angle of the tiled display 205. The rotation control information regarding the tiled display 205 according to an example embodiment may includes information for allowing each of display module to contact one surface of each of adjacent display modules or for moving each display module, such that neighboring display modules form one surface. Such information may include not only information regarding rotations of display modules, but also various other movements of the display modules, such as linear movements and curvilinear movements.

Furthermore, the image display apparatus 100 according to an example embodiment may adjust white balances of a plurality of display modules that displayed an input image.

Furthermore, the image display apparatus 100 according to an example embodiment may determine the rotation angle for rotation control information regarding the tiled display 205 as being equal to 90 degrees when the screen aspect ratio of an input image is detected as being equal to 21:9 (an anamorphic wide screen aspect ratio).

Furthermore, the image display apparatus 100 according to an example embodiment may determine the rotation angle of the tiled display 205 at a certain time interval by using the determined rotation control information.

Furthermore, the image display apparatus 100 according to an example embodiment may detect the screen aspect ratio of an input image and control the tiled display 205, such that each of the plurality of display modules rotate according to the detected screen aspect ratio of the input image in response to a user input.

Figure 2:
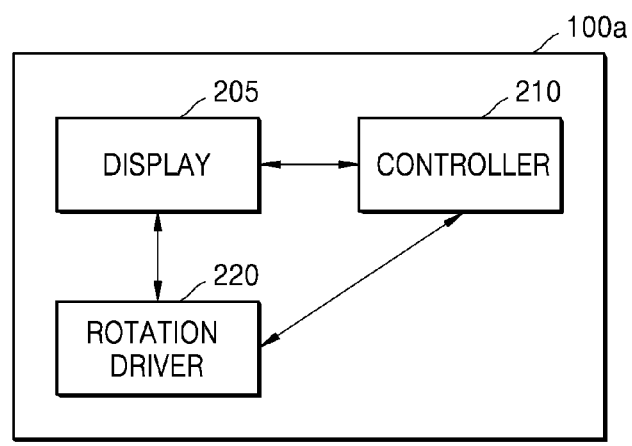
FIG. 2 is a block diagram showing a configuration of an image display apparatus according to an example embodiment.

FIG. 2 is a block diagram showing a configuration of an image display apparatus according to an example embodiment. An image display apparatus 100a of FIG. 2 may be an embodiment of the image display apparatus 100 of FIG. 1.

Referring to FIG. 2, the image display apparatus 100a according to an example embodiment may include a display 205, a controller 210, and a rotation driver 220.

The display 205 converts signals processed in the controller 210, such as a video signal, a data signal, an OSD signal, and a control signal, and generates a driving signal. The display 205 may be implemented as a plasma display panel (PDP), a liquid crystal display (LCD), an organic light-emitting display (OLED), a flexible display, and the like. Furthermore, the display 205 may also be implemented as a 3D display. Furthermore, the display 205 may be configured as a touch screen display and used as an input device as well as an output device.

The display 205 according to an example embodiment includes a plurality of display modules, and each of the display modules may be rotated.

The controller 210 may process a video signal and input the video signal to the display 120. Therefore, an image corresponding to the video signal may be displayed on the display 120. Furthermore, the controller 110 may determine rotation control information and input the rotation control information to the rotation driver 220. Therefore, the rotation driver 220 may rotate a tiled display.

The controller 210 according to an example embodiment may control the plurality of display modules to detect a screen aspect ratio of an input image, determine rotation control information regarding a tiled display according to the detected screen aspect ratio of the input image, rotate each of the plurality of display modules according to the determined rotation control information, and display the input image according to the determined rotation control information.

Furthermore, the controller 210 may control white balance of the plurality of display modules that are displaying the input image.

Furthermore, the controller 210 may control the plurality of display modules to determine the rotation angle of rotation control information as being equal to 90 degrees when the screen aspect ratio of the input image is detected as being equal to 21:9 (an anamorphic wide screen aspect ratio).

Furthermore, the controller 210 may control the plurality of display modules to determine a unit rotation angle of the image display apparatus 100 at a certain time interval by using the determined rotation control information.

The rotation driver 220 may rotate a display by using the rotation control information determined by the controller 210. The rotation driver 220 may be a motor, a gear, or any other device that may transmit rotational power and may not only rotate display modules, but also cause various movements of the display modules, e.g., a linear movement, a curvilinear movement, etc. Furthermore, the rotation driver 220 may be included in the controller 210.

The rotation driver 220 according to an example embodiment may rotate each of the plurality of display modules according to the rotation control information determined by the controller 210.

Figure 3:
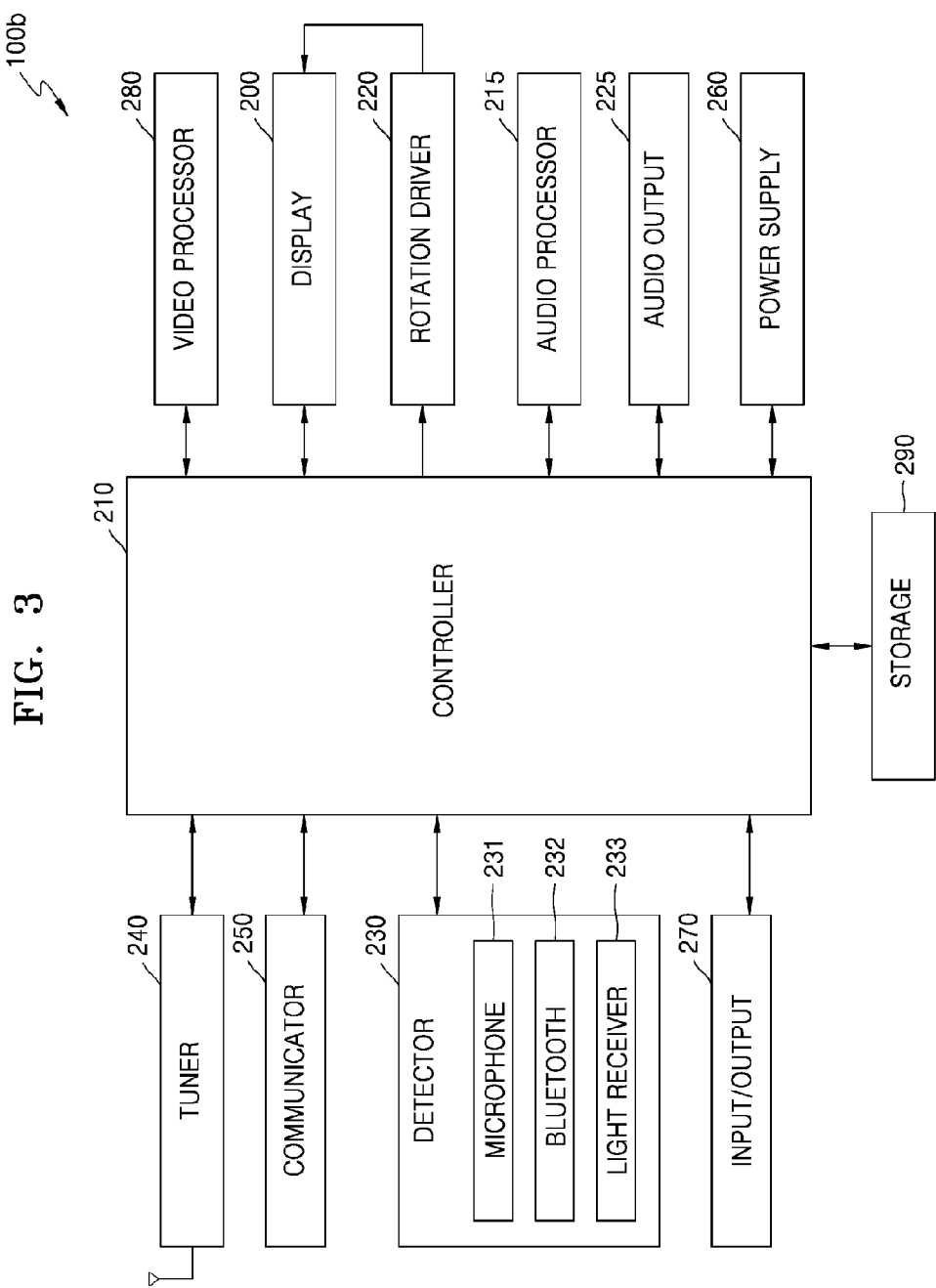
FIG. 3 is a block diagram showing a configuration of an image display apparatus according to an example embodiment.

FIG. 3 is a block diagram showing a configuration of an image display apparatus according to an example embodiment.

An image display apparatus 100b of FIG. 3 may be an embodiment of the image display apparatus 100 of FIG.

Referring to FIG. 3, the image display apparatus 100b according to an example embodiment may further include a video processor 280, an audio processor 215, an audio processor 215, an audio output unit 225, a power supply 260, a tuner 240, a communicator 250, an input/output unit 270, and storage 290 other than a tiled display 205, a controller 210, and a rotation driver 220.

Descriptions of the display 205, the controller 210, and the rotation driver 220 identical to those given above with reference to FIG. 2 will be omitted below.

The video processor 280 performs an image processing operation on video data received by the image display apparatus 100b. The video processor 280 may perform various image processing operations, such as decoding, scaling, noise filtering, frame rate conversion, and resolution conversion, on video data.

The display 205 displays a video included in a broadcast signal received via the tuner 240 under the control of the controller 210. Furthermore, the display 205 may display content (e.g., moving pictures) input via the communicator 250 or the input/output unit 270. The display 205 may output an image stored in the storage 290 under the control of the controller 210. The display 205 may further include a voice user interface (UI; e.g., an UI including a voice command word guide) for performing a voice recognition task corresponding to voice recognition or a motion UI (e.g., a UI including a user motion guide for motion recognition) for performing a motion recognition task corresponding to motion recognition.

The display 205 according to an example embodiment may include a tiled display including a plurality of display modules, wherein each of the display modules may be rotated.

According to an example embodiment, the controller 210 may determine rotation control information for rotating the plurality of display modules of the display 205 to display a received input image according to the screen aspect ratio of the received input image.

According to an example embodiment, the controller 210 may provide the rotation determined control information to the rotation driver 220, and thus the rotation driver 220 may rotate the plurality of display modules according to the determined rotation control information.

According to an example embodiment, the controller 210 may determine an area for displaying an input image in each of the plurality of rotated display modules. According to an example embodiment, the controller 210 may provide information regarding areas determined to display the input image and the input image to the display 205, thereby controlling each of the plurality of rotated display modules of the display 205 to display the input image based on the information regarding the areas determined to display the input image and the input image.

The rotation driver 220 may rotate the display by using rotation control information determined by the controller 210. The rotation driver 220 is a motor, a gear, or any other device that may transmit rotational power and may not only rotate display modules, but also cause various movements of the display modules, e.g., a linear movement, a curvilinear movement, etc. Furthermore, the rotation driver 220 may be included in the controller 210.

The rotation driver 220 according to an example embodiment may rotate each of the plurality of display modules according to the rotation control information determined by the controller 210.

The audio processor 215 performs audio processing operations on audio data. The audio processor 215 may perform various audio processing operations, such as decoding, amplification, noise filtering, etc. on audio data. Meanwhile, the audio processor 215 may include a plurality of audio processing modules for processing audio corresponding to a plurality of contents.

The audio output unit 225 outputs audio included in a broadcast signal received via the tuner 240 under the control of the controller 210. The audio output unit 225 may output audio (e.g., voice or sound) input via the communicator 250 or the input/output unit 270. Furthermore, the audio output unit 225 may output audio stored in the storage 290 under the control of the controller 210. The power supply 260 supplies power input from an external power source to the internal components of the image display apparatus 100b under the control of the controller 210. Furthermore, the power supply 260 may supply power output from one or more batteries (not shown) located inside the image display apparatus 100b to the internal components of the image display apx 100b under the control of the controller 210.

The tuner 240 may amplify, mix, and resonate a broadcast signal received via a wire or wirelessly, thereby tuning and selecting only the frequency of a channel to be received by the image display apparatus 100b from among many frequency components. A broadcast signal includes audio, video, and additional information (e.g., an electronic program guide (EPG)).

The tuner 240 may receive a broadcasting signal in a frequency band corresponding to a channel number (e.g., a cable broadcast No. 506) based on a user input (e.g., a control signal received from the control device 200, such as a channel number input, a channel up-down input, and a channel input on an EPG screen image).

The tuner 240 may receive a broadcasting signal from various sources, such as a ground wave broadcasting service, a cable broadcasting service, a satellite broadcasting service, and an internet broadcasting service. The tuner 240 may also receive a broadcasting signal from sources like an analog broadcasting service or a digital broadcasting service. A broadcasting signal received by the tuner 240 is decoded (e.g., audio decoding, video decoding, or additional information decoding) and is split to an audio signal, a video signal, and/or additional information. The audio signal, the video signal, and/or the additional information obtained from the broadcasting signal may be stored in the memory 290 under the control of the controller 210.

The image display apparatus 100b may include one tuner 240 or a plurality of tuners 240. The tuner 240 may be integrated with the image display apparatus 100b, may be embodied as an independent device (e.g., a set-top box (not shown)) having a tuner electrically connected to the image display apparatus 100b, or may be embodied as a tuner connected to the input/output unit 270.

The communicator 250 may connect the image display apparatus 100b to an external device (e.g., an audio device) under the control of the controller 210. The controller 210 may transmit/receive content to/from an external device connected thereto, download an application from the external device, or browse web pages, via the communicator 250.

The communicator 250 may receive a control signal from an external control device under the control of the controller 210. The control signal may be implemented as a Bluetooth signal, an RF signal, or a Wi-Fi signal.

The communicator 250 may include short-range wireless communication modules other than a Bluetooth module, e.g., a near field communication (NFC) module (not shown), a Bluetooth low energy (BLE) module (not shown), etc.

The detector 230 detects a voice of a user, an image of the user, or an interaction of the user and may include a microphone 231, a camera 232 and a light receiver 233.

The microphone 231 receives a voice uttered by a user. The microphone 231 may transform a received voice into an electric signal and output the electric signal to the controller 210. A user's voice may include a voice corresponding to a menu or a function of the image display apparatus 100b.

The camera 232 may receive an image (e.g., successive frames) corresponding to a user's motion including a gesture within a recognition range of the camera 232. The controller 210 may select a menu displayed on the image display apparatus 100b by using a result of recognizing a received motion or perform a task corresponding to the result of the motion recognition.

The light receiver 233 receives an optical signal (including a control signal) from an external control device via an optical window (not shown) of the bezel of the display 205. The light receiver 233 may receive an optical signal corresponding to a user input (e.g., a touch, a press, a touch gesture, a voice, or a motion) from the external control device. A control signal may be extracted from the received optical signal under the control of the controller 210.

The input/output unit 270 receives a video (e.g., moving pictures, etc.), an audio (e.g., voice, music, etc.), and additional information (e.g., an EPG, etc.) from outside of the image display apparatus 100b under the control of the controller 210. The controller 210 controls the overall operations of the image display apparatus 100b, controls signal flows between internal components of the image display apparatus 100b, and processes data. When a user input is applied or a certain condition is satisfied, the controller 210 may execute an operating system (OS) and various applications stored in the storage 290.

The storage 290 may store various data, programs, or applications for operating and controlling the image display apparatus 100b under the control of the controller 210. The storage 290 may store signals or data input/output in correspondence to operations of the video processor 280, the display 205, the rotation driver 220, the audio processor 215, the audio output unit 225, the power supply 260, the tuner 240, the communicator 250, the detector 230, and the input/output unit 270. The storage 290 may store control programs for controlling the image display apparatus 100b and the controller 210, applications initially provided by a manufacturer of the image display apparatus 100b or downloaded from outside, graphical user interfaces (GUI) related to the applications, objects (e.g., images, texts, icons, buttons, etc.) for providing the GUIs, user information, documents, databases, or data related thereto.

According to an example embodiment, the term "storage" includes the storage 290, the ROM 282 and the RAM 281 of the controller 210, and/or a memory card (not shown) attached to the image display apparatus 100b (e.g., a micro SD card, a USB memory, etc.). Furthermore, the storage 290 may include a non-volatile memory, a volatile memory, a hard disk drive (HDD), or a solid state disk (SSD).

Furthermore, the image display apparatus 100b including the display 205 may be electrically connected to an independent external device including a tuner (e.g., a set-top box) (not shown). For example, the image display apparatus 100b may be embodied as an analog TV, a digital TV, a 3D TV, a smart TV, a LED TV, an OLED TV, a plasma TV, or a monitor. However, it would be obvious to one of ordinary skill in the art that the present disclosure is not limited thereto.

Meanwhile, the image display apparatuses 100a and 100b shown in FIGS. 2 and 3 are merely embodiment of the image display apparatus 100 of FIG. 1. The components shown in FIGS. 2 and 3 may be integrated with one another, additional components may be introduced, or some of the components shown in FIGS. 2 and 3 may be omitted according to specifications of the actual image display apparatus 100. In other words, as occasion demands, two or more components may be integrated as a single component or a single component may be split to two or more components. Furthermore, functions performed by respective blocks are merely for describing embodiments, and operations and devices related thereto do not limit the present disclosure.

In the embodiment shown in FIG. 3, an image display apparatus includes one controller and a plurality of display modules. According to other embodiments, an image display device may include a plurality of controllers respectively corresponding to a plurality of display modules and the plurality of controllers may be respectively connected to the plurality of display modules.

Figure 4:
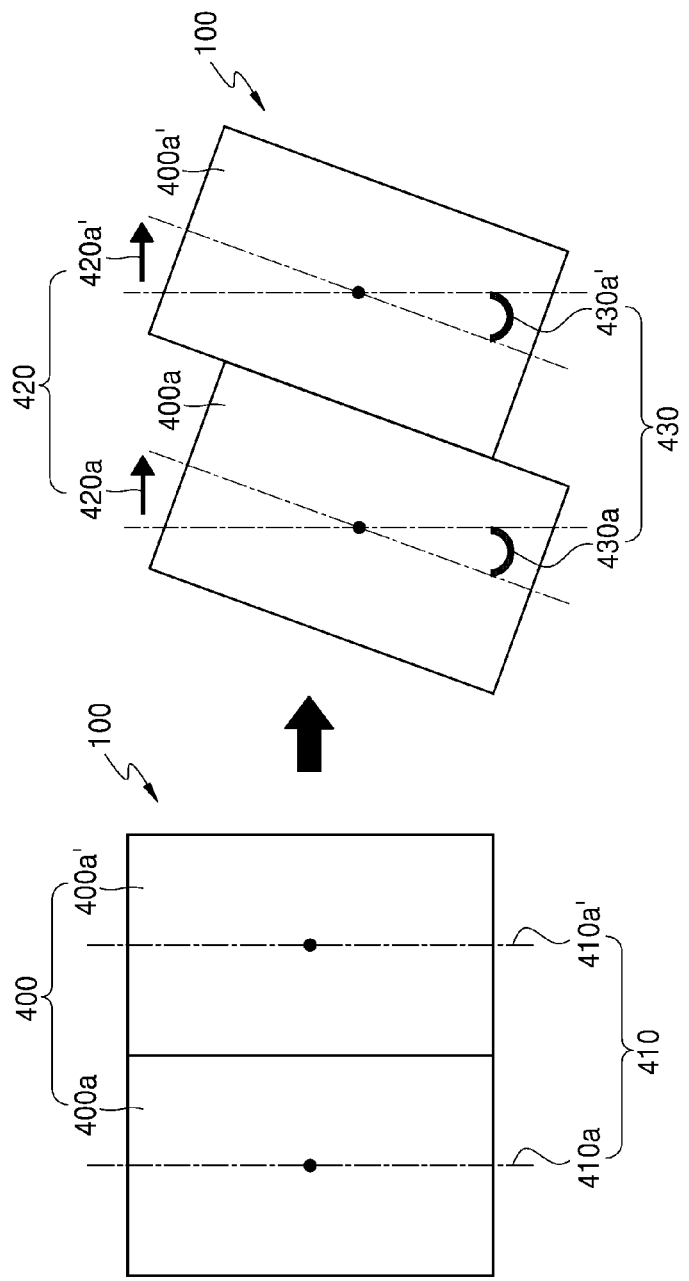
FIG. 4 is a diagram showing an example of determining rotation control information of a tiled display according to an example embodiment.

FIG. 4 is a diagram showing an example of determining rotation control information of a tiled display according to an example embodiment.

A tiled display 400 includes a plurality of display modules, and each of the display modules may be rotated. Although FIG. 4 shows the tiled display 400 including a first display module 400a and a second display module 400a' arranged side-by-side in a horizontal direction, but the present disclosure is not limited thereto. In other words, the number and arrangement of display modules constituting the tiled display 400 may vary. A reference line 410 of the tiled display 400 may be a reference for determining rotation control information regarding the tiled display 400. Referring to FIG. 4, the reference line 410 includes a first reference line 410a and a second reference line 410a', and the first reference line 410a and the second reference line 410a' are shown as a straight line passing through the center of the display module 400a and a straight line passing through the center of the second display module 400a', respectively. However, the present disclosure is not limited thereto. In other words, the reference line 410 may extend in various directions and may have a curved shape according to the shape of the tiled display 400.

The rotation control information regarding the tiled display 400 may include at least one of a rotating direction 420 of the tiled display 400, a rotation angle 430 of the tiled display 400, and a unit rotation angle of the tiled display 400. Furthermore, the rotation control information regarding the tiled display 400 may include information for moving display modules, such that a display module contacts one surface of another display module adjacent thereto or display modules adjacent to each other forms one surface. Such information may include not only information regarding rotations of display modules, but also various other movements of the display modules, such as linear movements and curvilinear movements.

The rotating direction 420 of the tiled display 400 indicates whether the tiled display 400 rotates rightward or leftward around the reference line 410. The rotating direction of the tiled display 400 may be different for each of the display modules thereof. Referring to FIG. 4, the rotating direction 420 includes a first rotating direction 420a and a second rotating direction 420a', wherein the first rotating direction 420a and the second rotating direction 420a' may indicate the rotating direction of the display module 400a and the rotating direction of the second display module 400a', respectively The rotation angle 430 of the tiled display 400 indicates an angle between 0 and 360 degrees by which tiled display 400 is rotated around the reference line 410. The rotation angle of the tiled display 400 may be different for each of the display modules thereof. Referring to FIG. 4, the rotation angle 430 includes a first rotation angle 430a and a second rotation angle 430a', and the first rotation angle 430a and the second rotation angle 430a' may indicate the rotation angle of the display module 400a and the rotation angle of the second display module 400a', respectively.

Furthermore, the unit rotation angle (not shown) of the tiled display 400 indicates an angle by which the tiled display 400 is rotated per unit time. The unit rotation angle includes a first unit rotation angle and a second unit rotation angle, and the first unit rotation angle and the second unit rotation angle may indicate a unit rotation angle of the first display module 400a and a unit rotation angle of the second display module 400a', respectively. According to an example embodiment, the image display apparatus 100 may control the tiled display 400 to determine the rotation angle of the tiled display 400 at a certain time interval using the determined rotation control information.

For example, referring to FIG. 4, when the image processing apparatus 100 controls the first display module 400a to be rotated by the determined first rotation angle 430a in t seconds and also controls the second display module 400a to be rotated by the determined second rotation angle in t' seconds, the first unit rotation angle (unit: degrees/sec) may be the determined first rotation angle 430a/t seconds and the second unit rotation angle 430a' (Unit: degrees/sec) may be the determined second rotation angle/t' seconds. Therefore, the image display apparatus 100 may control the tiled display 400 to determine rotation angles of the first display module 400a and the second display module 400a' at a certain time interval by using the determined first unit rotation angle and the determined second unit rotation angle. Here, according to an example embodiment, the image processing apparatus 100 may control the display modules to display an input image or to display a particular pattern.

According to an example embodiment, the image display apparatus 100 may determine the rotation control information regarding the tiled display 400, such that the screen aspect ratio of an input image is maintained. In other words, when an input image (referred to as a second input image) having a different screen aspect ratio from that of an input image (hereinafter referred to as a first input image) currently being output is input to the image display apparatus 100, the image display apparatus 100 may determine at least one of a rotating direction, a rotation angle, and a unit rotation angle of rotation control information to output the second input image while maintaining the screen aspect ratio of the second input image. Furthermore, the image display apparatus 100 may determine rotation control information regarding each display module to be different from one another to output a second input image while maintaining the screen aspect ratio of the second input image. Referring to FIG. 4, when a second input image is input, the rotating direction 420 of the rotation control information regarding the tiled display 400 may include the first rotating direction 420a and the second rotating direction 420a', whereas the rotation angle 430 may have the first rotation angle 430a and the second rotation angle 430a'. According to an example embodiment, since the image display apparatus 100 determines rotation control information regarding a tiled display when the screen aspect ratio of a second input image different from that of a first input image is input, the image display apparatus 100 may determine the rotation control information regarding the second image (hereinafter referred to as second rotation control information) based on a state of a tiled display to which rotation control information corresponding to a time point at which the first input image is input (hereinafter referred to as first rotation control information). For example, when the first rotation control information indicates that the rotating direction is a rightward direction and the rotation angle is 30 degrees, the second rotation control information may be determined based on a state of the tiled display to which the first rotation control information is reflected, that is, a state in which the tiled display is rotated rightward by 30 degrees.

Figure 5:
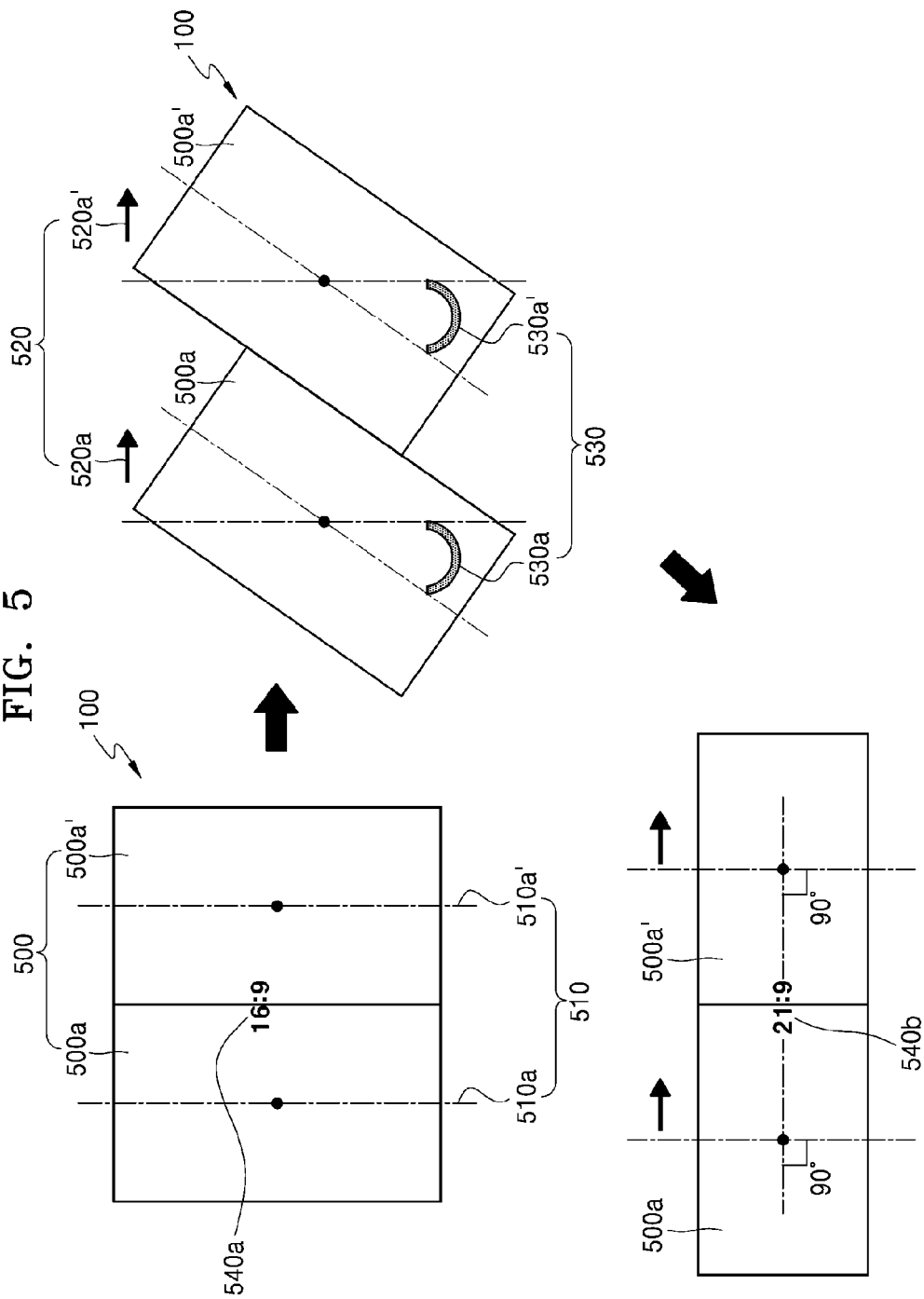
FIG. 5 is a diagram showing an example of determining a rotation angle of a tiled display as being equal to 90 degrees according to an example embodiment.

FIG. 5 is a diagram showing an example of determining a rotation angle of a tiled display to 90 degrees according to an example embodiment.

Referring to FIG. 5, a tiled display 500 may include a first display module 500a and a second display module 500a', the first display module 500a may have a first reference line 510a, a first rotating direction 520a, and a first rotating angle 530a, and the second display module 500a' may have a second reference line 510a', a second rotating direction 520a', and a second rotating angle 530a'.

Descriptions of the tiled display 500, the reference line 510, the rotating direction 520, and the rotation angle 530 identical to those given above with reference to FIG. 4 will be omitted below.

Referring to FIG. 5, the tiled display 500 includes display modules arranged side-by-side in a horizontal direction when the first input image 540a is input. It will be assumed below that, while a first input image 540a having the screen aspect ratio of 16:9 (wide screen aspect ratio) is input to the image display apparatus 100, a second input image 540b having the screen aspect ratio of 21:9 (anamorphic wide screen aspect ratio) is input. The image display apparatus 100 may determine rotation control information regarding the second input image 540b based on the current state of the tiled display 500. Referring to FIG. 5, the image display apparatus 100 may determine the rotation control information regarding the first display module 500a indicating that the rotating direction 520a is the rightward direction and the rotation angle 530a is 90 degrees. The display apparatus 100 may also determine the rotation control information regarding the second display module 500a' indicating that the rotating direction 520a' is the rightward direction and the rotation angle 530a' is 90 degrees.

Figure 6:
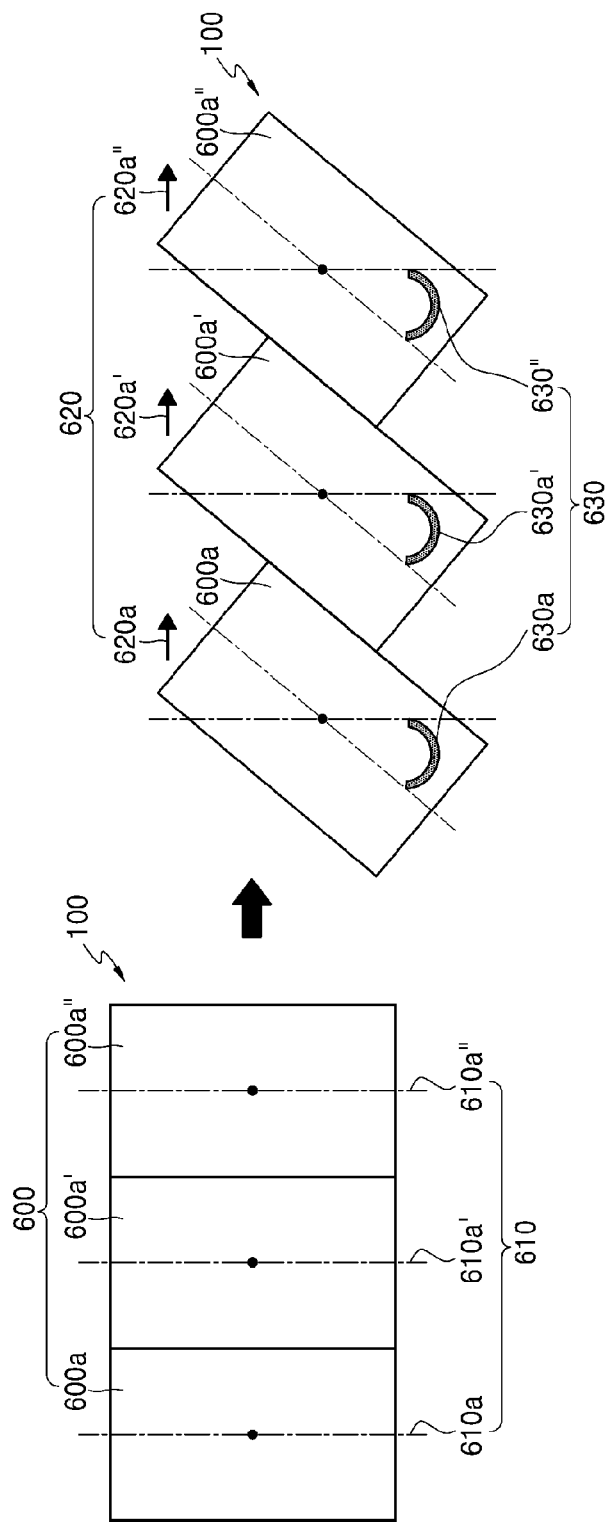
FIG. 6 is a diagram showing an operation of a tiled display including three display modules according to an example embodiment.

FIG. 6 is a diagram showing an operation of a tiled display including three display modules according to an example embodiment.

Referring to FIG. 6, a tiled display 600 may include a first display module 600a, a second display module 600a', and a third display module 600a". The first display module 600a may include a first reference line 610a, a first rotating direction 620a, and a first rotation angle 630a. Furthermore, the second display module 600a' may include a second reference line 610a', a second rotating direction 620a', and a second rotation angle 630a'. Furthermore, the third display module 600a" may include a third reference line 610a", a third rotating direction 620a", and a third rotation angle 630a".

According to an example embodiment, the image display apparatus 100 may determine rotation control information regarding the tiled display 600, such that the screen aspect ratio of an input image may be maintained. In other words, when an input image (referred to as a second input image) having a different screen aspect ratio from that of an input image (hereinafter referred to as a first input image) currently being output is input to the image display apparatus 100, the image display apparatus 100 may determine at least one of a rotating direction, a rotation angle, and a unit rotation angle of rotation control information to output the second input image while maintaining the screen aspect ratio of the second input image. Referring to FIG. 6, when a second input image is input, the rotating direction 620 of the rotation control information regarding the tiled display may include a first rotating direction 620a, a second rotating direction 620*a*', and a third rotating direction 620", and the rotation angle 630 may include a first rotation angle 630*a*, a second rotation angle 630*a*', and a third rotation angle 630*a*". Furthermore, the image display apparatus 100 may determine rotation control information regarding each display module to be different from one another to output a second input image while maintaining the screen aspect ratio of the second input image.

Figure 7:
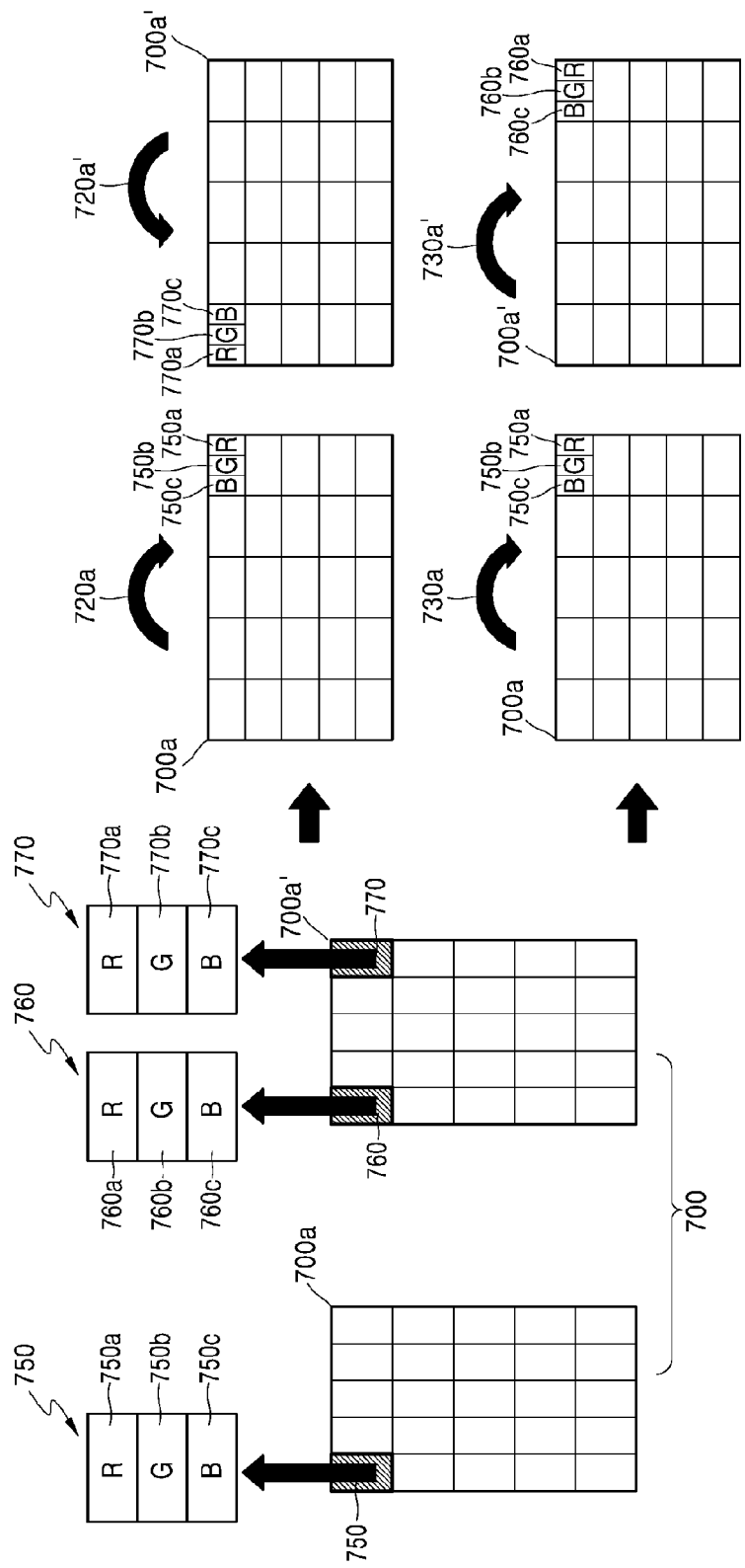
FIG. 7 is a diagram showing an operation of an image display apparatus according to a rotating direction of a tiled display according to an example embodiment.

FIG. 7 is a diagram showing an operation of an image display apparatus according to a rotating direction of a tiled display according to an example embodiment.

The image display apparatus 100 may adjust the white balance of a plurality of display modules that displayed an input image.

Referring to FIG. 7, a tiled display 700 may include a first display module 700*a* and a second display module 700*a*'. Any one pixel 750 of the first display module 700*a* may include three sub-pixels including an R 750*a*, a G 750*b*, and a B 750*c*. Furthermore, any one pixel 760 of the second display module 700*a*' may include three sub-pixels including an R 760*a*, a G 760*b*, and a B 760*c*. For convenience of explanation, FIG. 7 shows that the second display module 700*a*' further includes any one pixel 770 that includes three sub-pixels including an R 770*a*, a G 770*b*, and a B 770*c* and is disposed at a different location from the any one pixel 760.

Referring to FIG. 7, when rotation control information 720*a* of the first display module 700*a* indicates 90 degrees to the right and rotation control information 720*a*' of the second display module 700*a*' indicates 90 degrees to the left, while the three sub-pixels constituting the any one pixel 750 of the first display module 700*a* is arranged in the order of B, G, and R from the left, the three sub-pixels constituting the any one pixel 770 of the second display module 700*a*' may be arranged differently in the order of R, G, and B from the left. Furthermore, the first display module 700*a* and the second display module 700*a*' may have different the sub-pixel structures before and after rotations. Therefore, the image processing apparatus 100 may adjust the white balance of the first display module 700*a* and the second display module 700*a*' that displayed an input image. In other words, the color coordinate and color temperature of each of the first display module 700*a* and the second display module 700*a*' may be determined, and the white balance of the first display module 700*a* and the second display module 700*a*' may be adjusted by using the same.

Furthermore, referring to FIG. 7, when rotation control information 730*a* of the first display module 700*a* indicates 90 degrees to the right and rotation control information 730*a*' of the second display module 700*a*' indicates 90 degrees to the right (the rotation control information 730*a* and the rotation control information 730*a*' indicate a same direction), the three sub-pixels constituting the any one pixel 750 of the first display module 700*a* and the three sub-pixels constituting the any one pixel 760 of the second display module 700*a*' may be arranged in the order of B, G, R from the left. In this case, although the sub-pixels are arranged in a same order, but the sub-pixel structures of the first display module 700*a* and the second display module 700*a*' may still become different from each other before and after rotations. Therefore, the image processing apparatus 100 may adjust the white balance of the first display module 700*a*' and the second display module 700*a*' that displayed an input image. In other words, the color coordinate and color temperature of each of the first display module 700*a* and the second display module 700*a*' may be determined, and the white balance of the first display module 700*a*' and the second display module 700*a*' may be adjusted by using the same.

Therefore, the rotating direction of the first display module 700*a* and the rotating direction of the second display module 700*a*' to be identical to each other, such that the the three sub-pixels constituting the any one pixel 750 of the first display module 700*a* and the three sub-pixels constituting the any one pixel 760 of the second display module 700*a*' are arranged in a same order.

Figure 8:
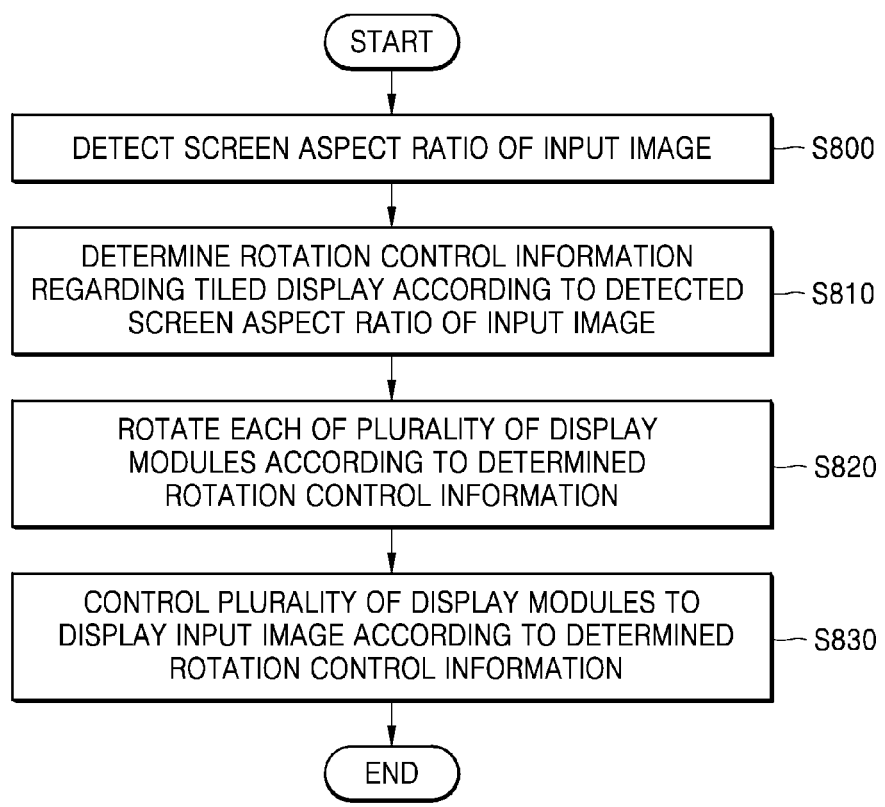
FIG. 8 is a flowchart showing an operating method of an image display apparatus according to an example embodiment.

FIG. 8 is a flowchart showing a method of operating an image display apparatus according to an example embodiment.

In operation S800, the image display apparatus 100 may detect the screen aspect ratio of an input image.

In operation S810, the image display apparatus 100 may determine rotation control information regarding a tiled display, which includes a plurality of individually rotatable display modules, according to the detected screen aspect ratio of the input image.

According to an example embodiment, the rotation control information regarding the tiled display may include at least one of a rotating direction of the tiled display, a rotation angle of the tiled display, and a unit rotation angle of the tiled display. The rotation control information regarding the tiled display may include information for moving the display modules, such that a display module contacts one surface of another display module adjacent thereto or display modules adjacent to each other forms one surface. Such information may include not only information regarding rotations of display modules, but also various other movements of the display modules, such as linear movements and curvilinear movements.

In operation S820, the image display apparatus 100 may rotate each of the plurality of display modules according to the determined rotation control information.

In operation S830, the image display apparatus 100 may control the plurality of display modules to display an input image according to the determined rotation control information.

The image display apparatus 100 according to an example embodiment may adjust the white balances of the plurality of display modules that displayed the input image.

The image display apparatus 100 according to an example embodiment may determine the rotation angle of the rotation control information regarding the tiled display to 90 degrees when the screen aspect ratio of an input image is detected as being equal to 21:9 (an anamorphic wide screen aspect ratio).

The image display apparatus 100 according to an example embodiment may determine the rotation angle of the tiled display at a certain time interval using the determined rotation control information.

Furthermore, the image display apparatus 100 according to an example embodiment may detects the screen aspect ratio of an input image and control the tiled display, such that each of the plurality of display modules rotates based on a user input according to the screen aspect ratio of the detected input image.

On the other hand, the above-described embodiments can be created as a program that can be executed by a computer and can be implemented on a general-purpose digital computer executes the program by using a computer-readable recording medium. Furthermore, the data structure used in the above-described embodiments can be recorded on the computer-readable recording medium through various means. Furthermore, the above-described embodiments may be embodied in the form of a recording medium including instructions executable by a computer, such as a program module executed by a computer. For example, methods implemented as software modules or algorithms may be stored in computer-readable recording media as codes or program instructions that can be read and executed by a computer.

The computer-readable recording medium can be any type of recording media that can be accessed by a computer, and can include volatile and non-volatile media and removable and non-removable media. The computer-readable recording medium may include magnetic storage media, such as ROMs, floppy disks, hard disks, and the like, and optical storage media, such as CD ROMs, and DVDs, but are not limited thereto. The computer-readable recording medium may also include a computer storage medium and a communication medium.

Furthermore, a plurality of computer-readable recording media may be distributed over networked computer systems, and data stored in the distributed recording media, such as program instructions and codes, may be executed by at least one computer.

The particular implementations shown and described herein are illustrative examples of the invention and are not intended to otherwise limit the scope of the invention in any way. For the sake of brevity, conventional electronics, control systems, software development and other functional aspects of the systems may not be described in detail.

The foregoing description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, the foregoing embodiments should be regarded as illustrative rather than limiting in all aspects. In an example, each component which has been described as a unitary part can be implemented as distributed parts. Similarly, each component which has been described as distributed parts can also be implemented as a combined part.

In the present disclosure, the use of any and all examples, or exemplary language (e.g., "such as") provided herein, is intended merely to better illuminate the invention and does not pose a limitation on the scope of the invention unless otherwise claimed.

Moreover, no item or component is essential to the practice of the invention unless the element is specifically described as "essential" or "critical".

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The terms like "units" and "modules" described in the specification mean units for processing at least one function and operation and can be implemented by software components, hardware components, or a combination thereof.

The "units" and "modules" may be embodied as programs that are stored on an addressable recording medium and may be executed by processors.

For example, the "units" and "modules" may be implemented with components, such as software components, object-oriented software components, class components, and task components, processes, functions, properties, procedures, subroutines, program code segments, drivers, firmware, micro codes, circuits, data, databases, data structures, tables, arrays, and variables.

What is claimed is:

1. An image display apparatus comprising:
a tiled display including a first display and a second display arranged side-by-side in a horizontal direction, each of the first display and the second display being rotatable; and
at least one processor configured to:
control the tiled display to display an image having a 16:9 screen aspect ratio,
obtain an input image having a 21:9 screen aspect ratio,
determine rotation control information comprising a rotating direction and a rotation angle of each of the first display and the second display to rotate the first display and the second display, according to the 21:9 screen aspect ratio of the input image, the rotating direction of the first display being identical to the rotating direction of the second display,
rotate each of the first display and the second display according to the determined rotation control information, and
control the tiled display including the rotated first display and the rotated second display to display the input image having the 21:9 screen aspect ratio,
wherein the rotation control information comprises information for moving each of the first display and the second display such that the first display and the second display form one surface without overlap.

2. The image display apparatus of claim 1, wherein the at least one processor is further configured to control white balances of the first display and the second display that displayed the input image.

3. The image display apparatus of claim 1, wherein the at least one processor is further configured to determine the rotation angle to be equal to 90 degrees.

4. The image display apparatus of claim 1, wherein the at least one processor is further configured to determine the rotation angle of each of the first display and the second display at a certain time interval by using the determined rotation control information.

5. The image display apparatus of claim 1, wherein the at least one processor is further configured to:
rotate each of the first display and the second display according to the determined rotation control information without vertically moving the center of each of the first display and the second display.

6. An operating method of an image display apparatus comprising a tiled display including a first display and a second display arranged side-by-side in a horizontal direction, each of the first display and the second display being rotatable and at least one processor to control the plurality of individually rotatable displays, the operating method comprising:
by the at least one processor:
controlling the tiled display to display an image having a 16:9 screen aspect ratio;
obtaining an input image having a 21:9 screen aspect ratio;
determining rotation control information comprising a rotating direction and a rotation angle of each of the first display and the second display for rotations of the first display and the second display included in the tiled display of the image display apparatus, according to the 21:9 screen aspect ratio of the input image, the rotating direction of the first display being identical to the rotating direction of the second display;

rotating the tiled display including the first display and the second display according to the determined rotation control information; and controlling the tiled display including the rotated first display and the rotated second display to display the input image having the 21:9 screen aspect ratio, wherein the rotation control information comprises information for moving each of the first display and the second display such that the first display and the second display form one surface without overlap.

7. The operating method of claim 6, further comprising controlling, by the at least one processor, white balances of the first display and the second display that displayed the input image.

8. The operating method of claim 6, wherein the determining of the rotation control information for the rotations of the first display and the second display included in the tiled display comprises determining the rotation angle to be equal to 90 degrees.

9. The operating method of claim 6, further comprising:
determining, by the at least one processor, a rotation angle for the rotations of the first display and the second display included in the tiled display at a certain time interval by using the determined rotation control information.

10. The operating method of claim 6, further comprising rotating each of the first display and the second display according to the determined rotation control information without vertically moving the center of each of the first display and the second display.

11. A computer program product comprising a non-transitory computer readable storage medium having a computer readable program stored therein, wherein the computer readable program, when executed on a computing device, causes the computing device to:

control a tiled display of an image display apparatus including a first display and a second display arranged side-by-side in a horizontal direction, each of the first display and the second display being rotatable, to display an image having a 16:9 screen aspect ratio;

obtain an input image having a 21:9 screen aspect ratio;

determine rotation control information comprising a rotating direction and a rotation angle of each of the first display and the second display for rotations of the first display and the second display, according to the 21:9 screen aspect ratio of the input image, the rotating direction of the first display being identical to the rotating direction of the second display;

rotate each of the first display and the second display according to the determined rotation control information; and control the tiled display including the rotated first display and the rotated second display to display the input image having the 21:9 screen aspect ratio, wherein the rotation control information comprises information for moving each of the first display and the second display such that the first display and the second display form one surface without overlap.

* * * * *